US010204175B2

(12) United States Patent
Hu et al.

(10) Patent No.: US 10,204,175 B2
(45) Date of Patent: Feb. 12, 2019

(54) DYNAMIC MEMORY TUNING FOR IN-MEMORY DATA ANALYTIC PLATFORMS

(71) Applicant: International Business Machines Corporation, Armonk, NY (US)

(72) Inventors: Zhenhua Hu, Toronto (CA); Min Li, San Jose, CA (US); Luna Xu, Blacksburg, VA (US); Yandong Wang, Elmsford, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/157,683

(22) Filed: May 18, 2016

(65) Prior Publication Data

US 2017/0337135 A1 Nov. 23, 2017

(51) Int. Cl.
*G06F 12/0893* (2016.01)
*G06F 17/30* (2006.01)
*G06F 12/0862* (2016.01)

(52) U.S. Cl.
CPC .... *G06F 17/30958* (2013.01); *G06F 12/0862* (2013.01); *G06F 2212/621* (2013.01)

(58) Field of Classification Search
CPC ...... G06F 12/08; G06F 17/30; G06F 12/0893; G06F 12/0862; G06F 12/0842; G06F 12/0813; G06F 2212/621; G06F 17/30958; G06F 2212/1024; G06F 2212/154; G06F 2212/602; G06F 12/0824
See application file for complete search history.

(56) References Cited

U.S. PATENT DOCUMENTS

| 5,784,699 A | 7/1998 | McMahon |
| 6,988,135 B2 | 1/2006 | Martin |
| 8,364,904 B2 | 1/2013 | Blake |

(Continued)

OTHER PUBLICATIONS

Josh Rosen, Deep Dive into Project Tungsten: Bringing Spark Closer to Bare Metal. Jun. 16, 2015, Downloaded from http://documents.tips/data-analytics/deep-dive-into-project-tungsten-bringing-spark-closer-to-bare-metal-josh.html pp. 1-28.

(Continued)

*Primary Examiner* — David Yi
*Assistant Examiner* — Zubair Ahmed
(74) *Attorney, Agent, or Firm* — David Quinn; Otterstedt, Ellenbogen & Kammer, LLP

(57) ABSTRACT

At a cache manager of a directed acyclic graph-based data analytic platform, memory usage statistics are obtained from each of a plurality of monitor components on a plurality of worker nodes. The worker nodes have a plurality of tasks executing thereon, and each of the tasks has at least one distributed dataset associated therewith. Each of the worker nodes has a distributed dataset cache. At least one of the following is carried out: increasing a size of a given one of the distributed dataset caches if the memory usage statistics indicate that corresponding ones of the tasks are using too little memory; and decreasing a size of another given one of the distributed dataset caches if the memory usage statistics indicate contention between corresponding ones of the tasks and a corresponding one of the distributed datasets.

14 Claims, 14 Drawing Sheets

(56) References Cited

U.S. PATENT DOCUMENTS

| | | | |
|---|---|---|---|
| 8,504,791 | B2 | 8/2013 | Cheriton |
| 8,533,432 | B2 | 9/2013 | Satish |
| 8,914,590 | B2 | 12/2014 | Vorbach |
| 2002/0144101 | A1* | 10/2002 | Wang ............... G06F 9/3802 712/240 |
| 2008/0229027 | A1 | 9/2008 | Shioya et al. |
| 2012/0222005 | A1* | 8/2012 | Harris ............... G06F 9/45504 717/120 |
| 2012/0226866 | A1 | 9/2012 | Bozek |
| 2012/0304171 | A1 | 11/2012 | Joshi |
| 2013/0086324 | A1 | 4/2013 | Soundararajan |
| 2014/0108740 | A1 | 4/2014 | Rafacz et al. |
| 2014/0136766 | A1 | 5/2014 | Smith et al. |
| 2014/0282624 | A1 | 9/2014 | Holt |
| 2014/0351549 | A1 | 11/2014 | Harris et al. |
| 2015/0046654 | A1 | 2/2015 | Soundararajan |
| 2015/0067088 | A1* | 3/2015 | Guerin ............... G06F 15/167 709/213 |
| 2016/0103677 | A1 | 4/2016 | Melski |
| 2016/0170882 | A1* | 6/2016 | Choi ............... G06F 12/0806 711/119 |

OTHER PUBLICATIONS

Hao Zhang et al, Efficient Inmemory Data Management: An Analysis. 40th International Conference on Very Large Data Bases, Sep. 1-5, 2014. pp. 833-836.

Yandong Wang et al, Characterization and Optimization of Memory-Resident MapReduce on HPC Systems. 2014 IEEE 28th International Parallel & Distributed Processing Symposium. pp. 799-808.

Kunal Agrawal et al, Cache-Conscious Scheduling of Streaming Applications. Proceedings of the twenty-fourth annual ACM symposium on Parallelism in algorithms and architectures. pp. 236-245.

Jacob Nelson et al, Latency-Tolerant Software Distributed Shared Memory. Proceedings of the 2015 USENIX Annual Technical Conference (USENIC ATC '15). pp. 291-305.

Deep Dive into Project Tungsten: Bringing Spark Closer to Bare Metal.. Downloaded on http://www.slideshare.net/SparkSummit/deep%ADdive%ADinto%ADproject%ADtungsten%ADjosh%ADrosen?from_action=save on Apr. 22, 2016. pp. 1-43.

Wikipedia, Directed acyclic graph. Downloaded from https://en.wikipedia.org/wiki/Directed_acyclic_graph on Mar. 17, 2016. pp. 1-9.

Hadoop Tips: Resilient Distributed Datasets (RDD) for the impatient. Downloaded from http://www.thecloudavenue.com/2014/01/resilientdistributeddatasetsrdd.html on Mar. 17, 2016. pp. 1-3.

Po-Kuan Huang et al, Joint Throughput and Energy Optimization for Pipelined Execution of Embedded Streaming Applications. Proceedings of the 2007 ACM SIGPLAN/SIGBED conference on Languages, compilers, and tools for embedded systems, 42(7), 137-139.

Min Li et al., unpublished U.S. Appl. No. 15/157,637, filed May 18, 2016 entitled Dynamic Cache Management for In-Memory Data Analytic Platforms, 40 pages plus 14 sheets formal drawings.

List of IBM Patents or Patent Applications Treated As Related.

MateiZaharia et al, Resilient Distributed Datasets a Fault—Tolerant Abstraction for In-Memory Cluster Computing. Amplab, UC Berkeley, NSDI'12, 2012. pp. 1-14.

Vadim Abrossimov et al, Generic Virtual Memory Management for Operating System Kernels. ACM 1989, pp. 123-136.

Ganesh Ananthanarayanan et al, PACMan: Coordinated Memory Caching for Parallel Jobs. NSDI'12, 2012. pp. 1-14.

Spark Architecture. Downloaded from http://0x0fff.com/sparkarchitecture/ on Apr. 11, 2016. pp. 1-23.

Wikipedia, Support vector machine. Downloaded from https://en.wikipedia.org/wiki/Support_vector_machine on Mar. 17, 2016. pp. 1-18.

Haoyuan Li et al, Tachyon: Reliable, Memory Speed Storage for Cluster Computing Frameworks. SoCC '14, Nov. 3-5, 2014. pp. 1-15.

Gennady Pekhimenko et al. Exploiting Compressed Block Size as an Indicator of Future Reuse. SAFARI Technical Report No. #2013-003 (Dec. 21, 2013). pp. 1-14.

Min Li et al. MRONLINE: MapReduce Online Performance Tuning. HPDC'14, Jun. 23-27, 2014. pp. 1-12.

Joshua Lewis et al. An Automatic Prefetching and Caching System. 2010 IEEE. pp. 180-187.

International Business Machines Corporation, A Methodology for Size Adjustment in Adaptive Cache Size Management. Original Publication Date: Jun. 18, 2003. IP.com No. 000013268. pp. 1-4.

Anonymous, System and Method for Adaptive protocol based smart caching on Servers. An IP.com Prior Art Database Technical Disclosure. IP.com No. 000229518. pp. 1-4.

Anonymous, Cache memory management. An IP.com Prior Art Database Technical Disclosure. IP.com No. 000240105.

Michael Frasca et al. Virtual I/O Caching: Dynamic Storage Cache Management for Concurrent Workloads. 2011 ACM , SC//, Nov. 12-18, 2011. pp. 1-11.

In Quest of Machine Learning in SQL Metanautix. Downloaded from https://web.archive.org/web/20151130142455/https://metanautix.com/blog/inquestofmachinelearninginsql/ on May 16, 2016. Dec. 18, 2014. pp. 1-4.

Merv Adrian & Colin White. Analytic Platforms:Beyond the Traditional Data Warehouse. BeyeNETWORK Custom Research Report. Prepared for Vertica. 2010 TechTarget, RI Research, IT Market Strategy. pp. 1-33.

Techopedia, Analytics Platform. Downloaded from https://www.techopedia.com/definition/29493/analytics-platform on May 13, 2016. pp. 1.

Terminology: Analytic platforms. Downloaded from http://www.dbms2.com/2011/02/24/analytic-platforms/ on May 13, 2016. pp. 1-8, Feb. 24, 2011.

Michael Stonebreaker et al. MapReduce and Parallel DBMSs: Friends or Foes? Downloaded from http://cacm.acm.org/magazines/2010/1/55743-mapreduce-and-parallel-dbmss-friends-or-foes/fulltext on May 13, 2016. pp. 1-11 Communications of the ACM v.53 No. 1, Jan. 2010.

Matei Zaharia et al., Resilient Distributed Datasets a Fault—Tolerant Abstraction for In-Memory Cluster Computing, slides 1-30, accompanying NSDI'12, 2012 paper (NPL 12).

Zaharia, Matei et al. "Resilient Distributed Datasets: A Fault-Tolerant Abstraction for In-Memory Cluster Computing" Jul. 19, 2011. University of California at Berkeley EECS. pp. 1-15. Also available at https://www2.eecs.berkeley.edu/Pubs/Tech Rpts/2011 /EECS-2011-S2.pdf (alternative version to previous citation).

* cited by examiner

DYNAMIC MEMORY TUNING FOR IN-MEMORY DATA ANALYTIC PLATFORMS

BACKGROUND

The present invention relates to the electrical, electronic and computer arts, and, more particularly, to caching, pre-fetching, and the like.

In-memory directed acyclic graph (DAG)-based data analytic platforms support complex data analytic workflows in a high performance, distributed, fault-tolerant way. The Spark framework provides programmers with an application programming interface centered on a data structure called the resilient distributed dataset (RDD), a read-only multiset of data items distributed over a cluster of machines. Spark has been rapidly adopted by industry.

Memory management is pertinent in order for in-memory Spark to achieve high performance. Memory is becoming a scarce resource due to RDD data persistence: intermediate data are usually cached in disk and memory to avoid re-computation. The management of the RDD cache is oblivious to the DAG scheduling. Suboptimal memory management can lead to significant performance degradation and low memory efficiency.

DAG is easy to use and popular; DAG with Spark is memory intensive. The RDD abstraction used by Spark is like a specialized cache used to store intermediate data. Currently, management of RDD uses a traditional policy called Least Recently Used (LRU); the current technique is, as noted, oblivious to DAG scheduling and is suboptimal.

SUMMARY

Principles of the invention provide techniques for dynamic memory tuning for in-memory data analytic platforms and the like. In one aspect, an exemplary method includes obtaining, at a cache manager of a directed acyclic graph-based data analytic platform, from each of a plurality of monitor components on a plurality of worker nodes of the directed acyclic graph-based data analytic platform, memory usage statistics for the worker nodes of the directed acyclic graph-based data analytic platform. The worker nodes have a plurality of tasks executing thereon. Each of the tasks has at least one distributed dataset associated therewith. Each of the worker nodes has a distributed dataset cache. A further step includes carrying out at least one of: increasing a size of a given one of the distributed dataset caches if the memory usage statistics indicate that corresponding ones of the tasks are using too little memory; and decreasing a size of another given one of the distributed dataset caches if the memory usage statistics indicate contention between corresponding ones of the tasks and a corresponding one of the distributed datasets.

In another aspect, an exemplary directed acyclic graph-based data analytic platform includes a plurality of worker nodes; a plurality of monitor components on the plurality of worker nodes; a plurality of distributed dataset caches on the plurality of worker nodes; and a cache manager, coupled to the plurality of monitor components. The cache manager obtains, from each of the plurality of monitor components on the plurality of worker nodes, memory usage statistics for the worker nodes. The worker nodes have a plurality of tasks executing thereon. Each of the tasks has at least one distributed dataset associated therewith. The cache manager carries out at least one of: increasing a size of a given one of the distributed dataset caches if the memory usage statistics indicate that corresponding ones of the tasks are using too little memory; and decreasing a size of another given one of the distributed dataset caches if the memory usage statistics indicate contention between corresponding ones of the tasks and a corresponding one of the distributed datasets.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example, one or more embodiments provide any one, some, or all of the following benefits:

effectively overlap computation with input/output (I/O) pre-fetch and alleviate the I/O bottleneck;
improve memory utilization efficiency;
speed up workload execution;
improved single workload execution performance;
guarantee of multiple workload performance according to priority in a multitenant environment, and/or
improved memory utilization efficiency.

These and other features and advantages of the present invention will become apparent from the following detailed description of illustrative embodiments thereof, which is to be read in connection with the accompanying drawings.

DETAILED DESCRIPTION

Figure 1:
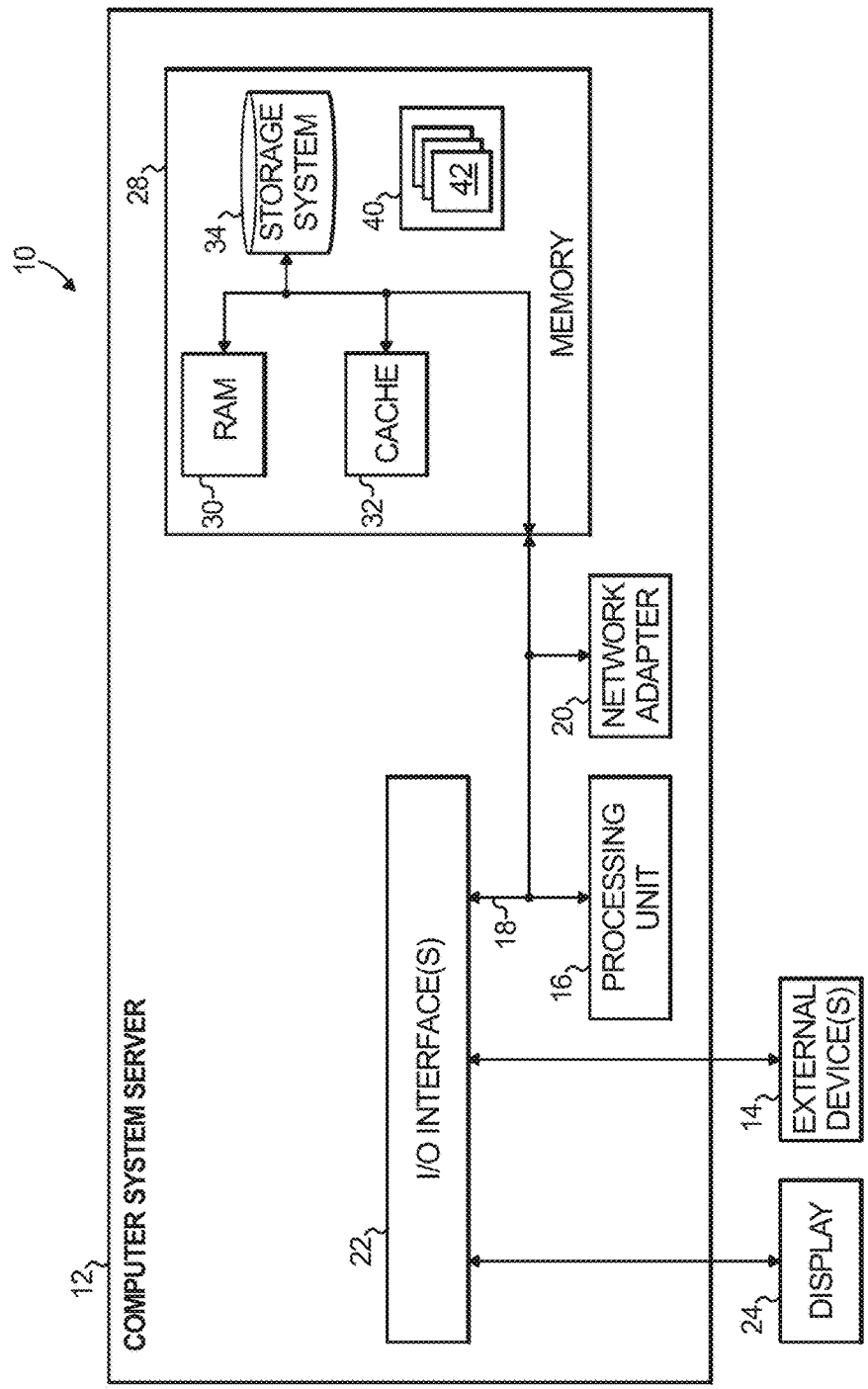
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
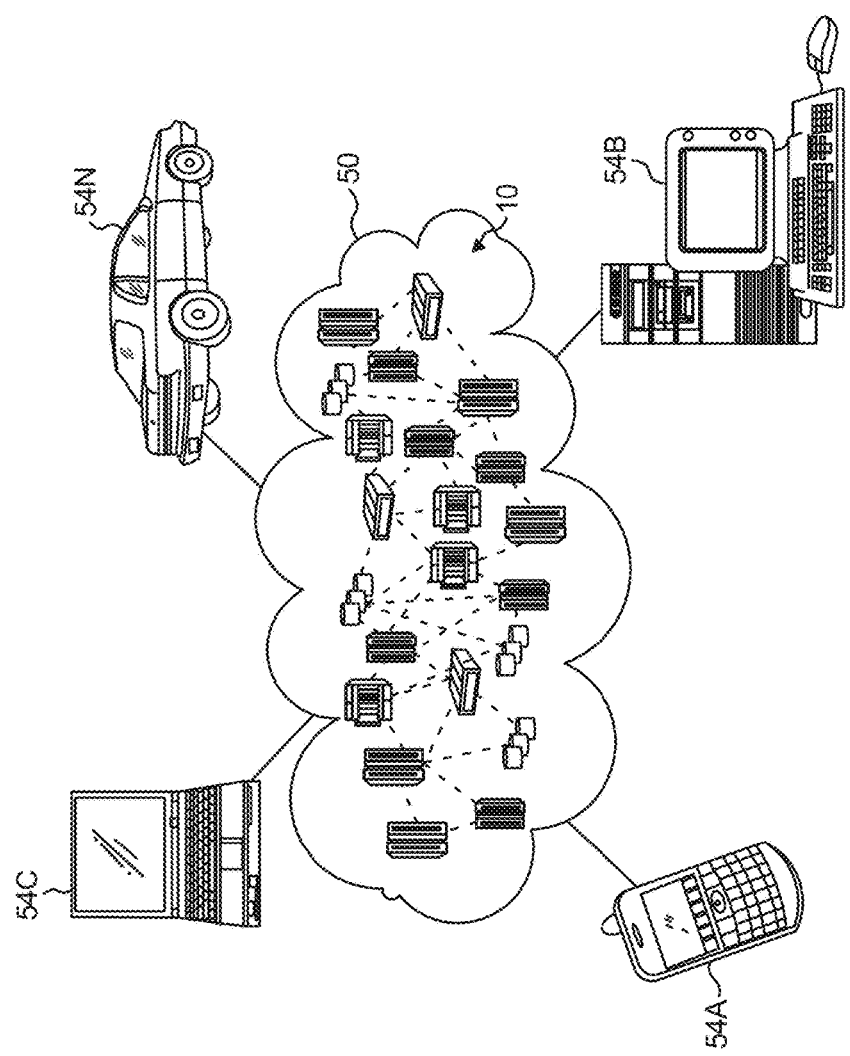
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
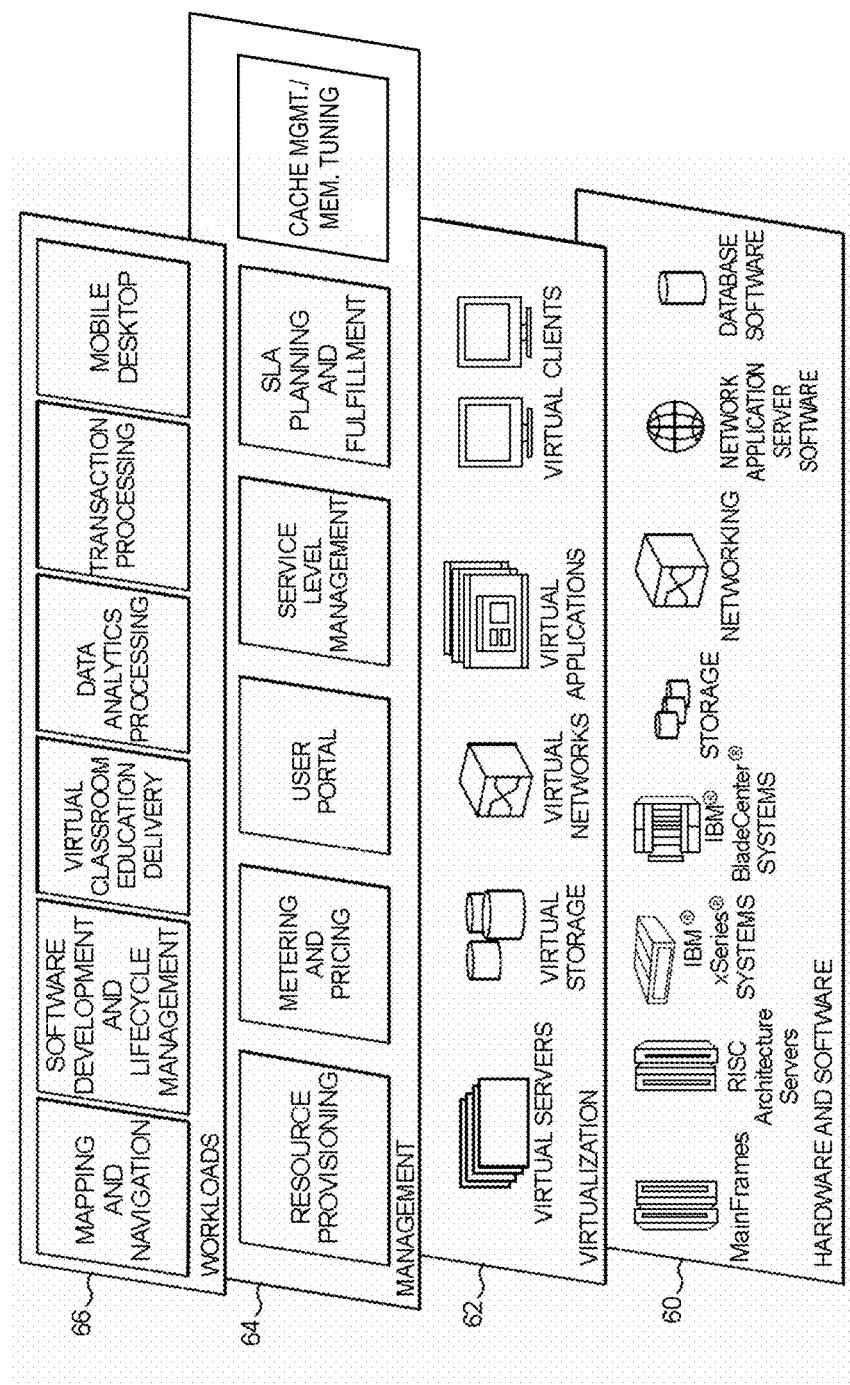
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, in-memory directed acyclic graph (DAG)-based data analytic platforms support complex data analytic workflows in a high performance, distributed, fault-tolerant way. The Spark framework provides programmers with an application programming interface centered on a data structure called the resilient distributed dataset (RDD), a read-only multiset of data items distributed over a cluster of machines. Spark has been rapidly adopted by industry.

Memory management is pertinent in order for in-memory Spark to achieve high performance. Memory is becoming a scarce resource due to RDD data persistence: intermediate data are usually cached in disk and memory to avoid re-computation. The management of the RDD cache is oblivious to the DAG scheduling. Suboptimal memory management can lead to significant performance degradation and low memory efficiency.

DAG is easy to use and popular; DAG with Spark is memory intensive. The RDD abstraction used by SPARK is essentially a specialized cache used to store intermediate data. Currently, management of RDD uses a traditional policy called Least Recently Used (LRU); the current technique is, as noted, oblivious to DAG scheduling and is suboptimal.

Figure 4:
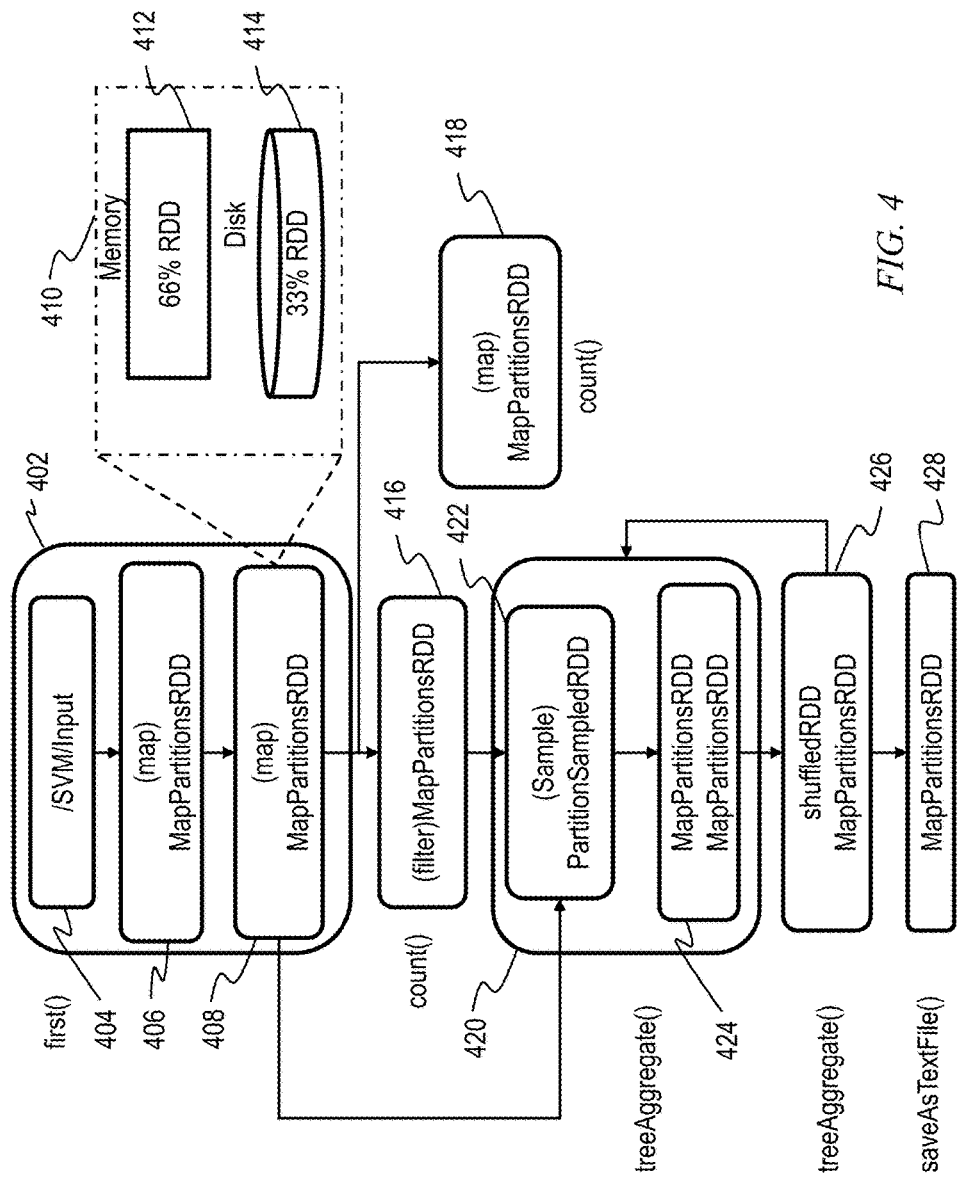
FIG. 4 depicts an exemplary support vector machine (SVM) DAG, according to an aspect of the invention.

FIG. 4 depicts an exemplary support vector machine (SVM) DAG scheduling graph, according to an aspect of the invention. Each of the rectangles 404, 406, 408, 416, 418, 422, 424, 426, and 428 represents an RDD. Multiple RDDs can be stored in the same cache. For each RDD, Spark will arrange a set of tasks to process the RDD. For example, there are three RDDs shown at 402: /SVM/input 404; MapPartitionsRDD 406; and MapPartitionsRDD 408. There are thus three RDDS in the first function "first( )" that is being called. As seen, for example, at 410, RDDs can be stored in memory 412, or stored on disk 414, or stored in both memory and disk. In the particular example 410, the RDD 408 is 66% in volatile memory 412 and 33% on disk 414. It is generally not efficient to store the entire RDD in memory. The other RDDs 404, 406, 416, 418, 422, 424, 426, and 428 are generated by the computation but not cached, in this example. The user can decide how and whether to cache RDDs. Issues arise where there are two RDDs competing for the same cache but there is insufficient space to cache both of them. One or more embodiments help to decide what RDD to store in a cache; e.g., only the first RDD, only the second RDD, or part of each RDD.

In the example of FIG. 4, there are a number of different functions: first( ) 402; count( ) 416, 418; treeAggregate( ) 420, 426; and saveAsTextFile( ) 428; each function has one or more RDDs and it is desired to determine whether to cache the RDD 408. Where a function has only a single RDD, the same reference character is used to refer to both the function and the RDD. In FIG. 4, first call the first( ) function which generates three RDDs 404, 406, 408 and then utilize the count( ) function which generates another intermediate RDD 416. Call the treeAggregate( ) function and generate two RDDs 422, 424. There is a loop between the two treeAggregate( ) functions 420, 426. The first treeAggregate( ) function 420 will take the input from the RDD 408. RDD 408 is selected for caching because it is used many times. It is efficient to cache items that will be re-used to avoid the necessity for re-computation next time.

Figure 5:
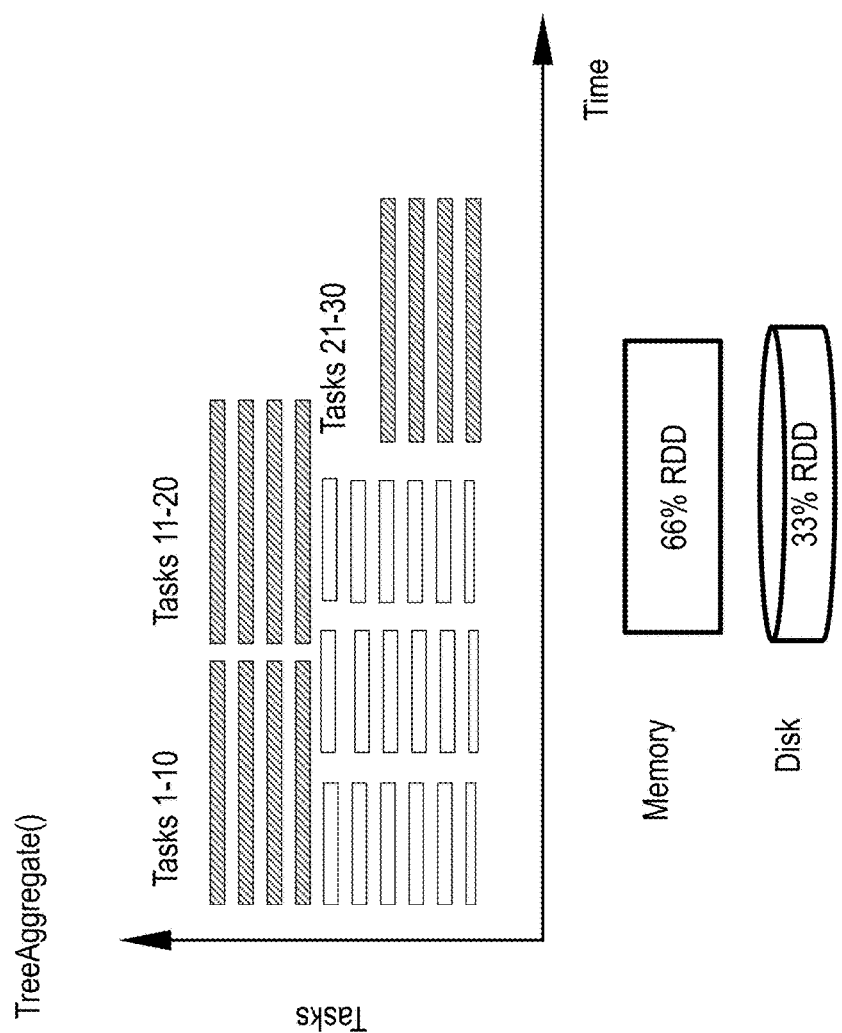
FIG. 5 shows problematic performance observed in a system not using one or more aspects of the invention.

FIG. 5 illustrates the impact on execution time of not being able to store all the RDD data in a cache, for the TreeAggregate( ) function. Tasks 1-10, 11-20, and 21-30 (shaded rectangles) are running much slower than the other tasks (un-shaded rectangles). The fast-running tasks (un-shaded rectangles) are able to read required data from memory, run faster, and thus occupy less space on the time axis. Tasks 1-10, 11-20, and 21-30 (shaded rectangles) have to read data from disk, and thus occupy more space on the time axis.

One or more embodiments advantageously provide dynamic DAG-aware RDD memory management. In particular, one or more embodiments dynamically manage the in-memory RDD cache blocks based on DAG information. A sliding window of the working dataset (working dataset=tasks that will be processed soon (e.g. in next 10-30 seconds)) is maintained by considering which tasks have been processed, which tasks have not been processed, and the task dependency. One or more embodiments pre-fetch and cache RDD blocks that are will be processed soon based on the DAG. Thus, this data is already in memory when the next tasks are launched. RDD blocks that have been processed and will not be used are evicted. The scheduling policies of the task scheduler are respected. One or more embodiments provide a centralized approach which enables easy adoption. One or more embodiments effectively overlap computation with input/output (I/O) pre-fetch and alleviate the I/O bottleneck; improve memory utilization efficiency; and/or speed up workload execution.

When a cache becomes full, it is necessary to decide what kind of data will be brought in and what kind of data will be evicted to make room for the newly needed data. In one or more embodiments, a task scheduler decides which set of tasks to execute first. Advantageously, one or more embodiments permit effectively reducing the I/O latency by pre-fetching; thus alleviating the I/O bottleneck illustrated in FIG. 5.

Figure 6:
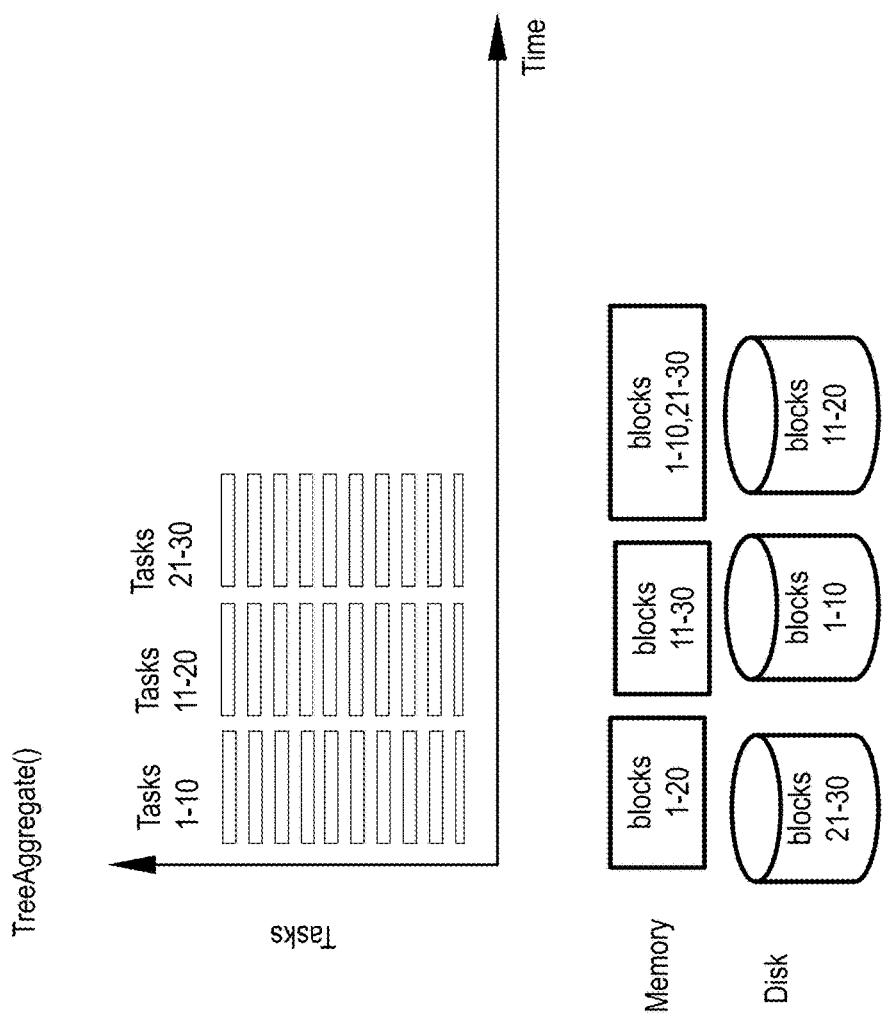
FIG. 6 shows performance improvement as observed in comparison to FIG. 5, according to an aspect of the invention.

FIG. 6 shows exemplary improvement (compared to FIG. 5) using aspects of the invention; here, all needed data is in memory and tasks are executing quickly. For the first wave (Tasks 1-10), blocks 1-20 are in memory and blocks 21-30 are kept on disk. For the next wave (Tasks 11-20), blocks 11-30 are brought into memory and blocks 1-10 are put on disk. One or more embodiments swap back and forth between volatile memory and disk in an anticipatory fashion, based on what will be needed next. For the final wave (Tasks 21-30), blocks 1-10 and 21-30 are in memory and blocks 11-20 are on disk.

Figure 7:
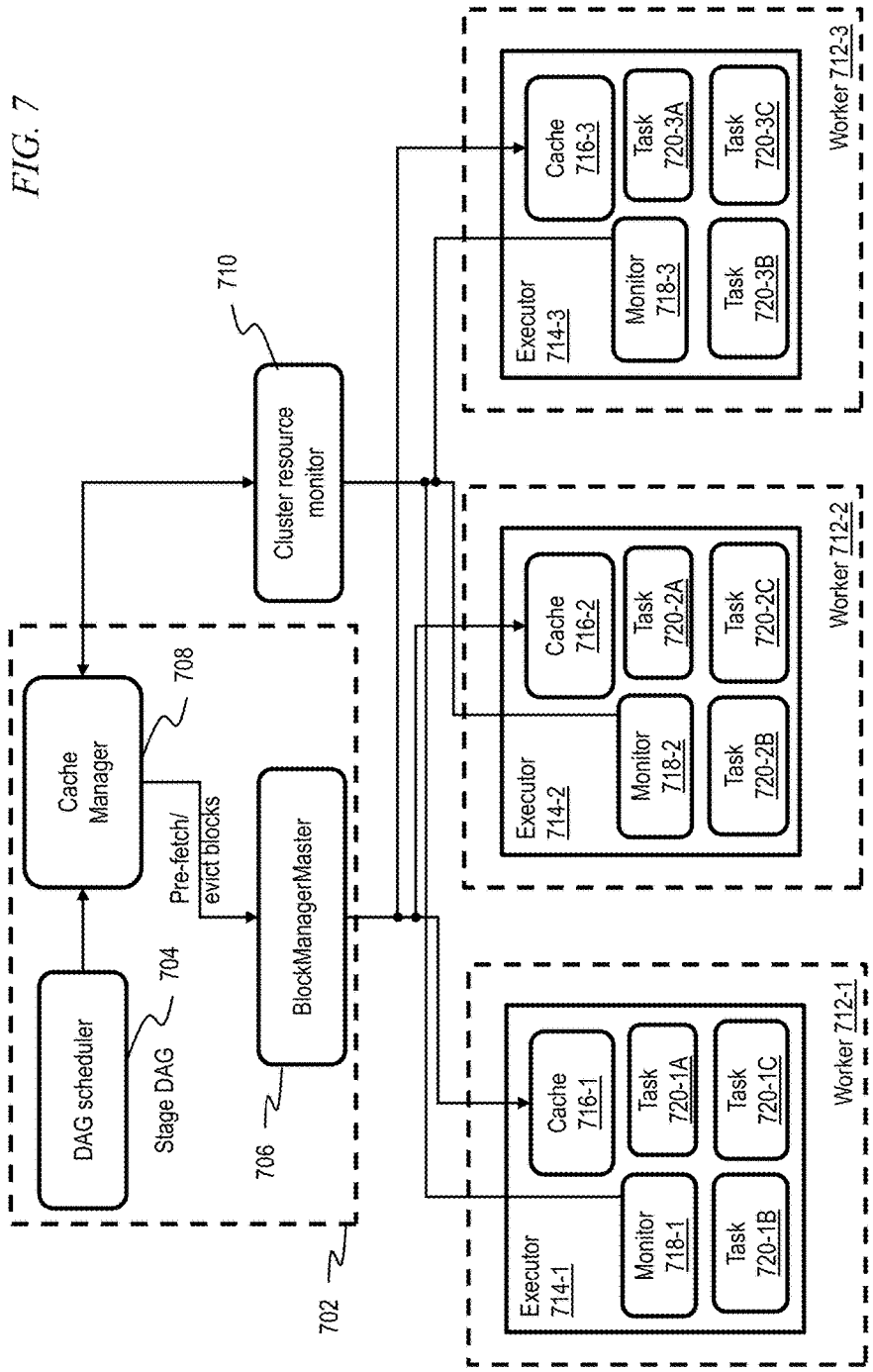
FIG. 7 depicts an exemplary dynamic RDD memory configuration architecture, according to an aspect of the invention.

FIG. 7 shows an exemplary design architecture. Elements 708, 718-1, 718-2, and 718-3 are new; the remainder of the elements will be familiar to the skilled artisan. The Cache Manager 708 is a centralized component within the SPARK Driver 702. Within the SPARK Driver 702 are the DAG scheduler 704, which has the DAG information for the application; and the Cache Manager 708, which communicates with the BlockManagerMaster 706 (and via same to the monitors 718-1, 718-2, and 718-3), and the Cluster resource monitor 710, and determines which blocks are to be pre-fetched and which blocks are to be deleted (evicted). The Cache Manager 708 instructs the BlockManagerMaster 706, which sends the information to the Executors 714-1, 714-2, 714-3, which are the compute engines residing on different machines (e.g., Workers 712-1, 712-2, and 712-3). The Monitor 718-1, 718-2, 718-3 inside each Executor 714-1, 714-2, 714-3 monitors the RDD cache utilization for, respectively, cache 716-1, 716-2, and 716-3. Each monitor collects the task statistics for the corresponding tasks (e.g., tasks 720-1A, 720-1B, and 720-1C are the tasks corresponding to monitor 718-1; tasks 720-2A, 720-2B, and 720-2C are the tasks corresponding to monitor 718-2; and tasks 720-3A, 720-3B, and 720-3C are the tasks corresponding to monitor 718-3; tasks generally are referred to as 720), and each monitor will send the task statistics for the corresponding tasks to the cache manager 708. Examples of task statistics include task progress rate and task I/O usage. The cache manager 708 will decide what blocks to pre-fetch and what blocks to evict, based on the data obtained from each monitor (see also discussion below). All the blocks in FIG. 7 are implemented in software, except the caches 716-1, 716-2, and 716-3 which are physical memory, and the workers 712-1, 712-2, and 712-3, which can be physical machines or virtual machines running on physical machines.

Thus, monitor components 718-1, 718-2, and 718-3 runs on each executor 714-1, 714-2, and 714-3 to monitor the memory usage statistics periodically; one non-limiting example of such memory usage is so-called "garbage collection" (GC) frequency. Based on the observations, the cache manager 708 decides whether to increase or decrease the RDD cache size. Cluster resource monitor 710 gathers information from monitors 718-1, 718-2, 718-3 on each worker and sends it to cache manager 708. The cache manager 708 uses this information to help make the decision.

In an alternative embodiment (FIG. 11 discussed below), it is possible to adjust the size of the cache. A decider component 1299 is instructed to make size changes. The decider component assists RDD eviction when the monitor decides to decrease the RDD cache size; by gathering the DAG information from DAG scheduler 704, evicting needed RDDs can be avoided. In another approach in the alternative embodiment, rather than using the decider, the cache manager component 708 changes the size and evicts RDDs when needed.

Thus, various aspects include when and how much to fetch and/or adjusting cache size.

Furthermore regarding the RDD cache manager 708, in one or more embodiments, the cache manager obtains runtime task scheduling statistics from monitors 718-1, 718-2, and 718-3, including which tasks have been processed and which tasks are in the task queue. Manager 708 also obtains the current stage DAG from DAG scheduler 704, and determines the RDDs to drop and the RDDs to pre-fetch. If the task(s) have been processed and no other tasks depend on the RDD blocks, evict the RDD blocks from the cache and store them on disk if storing blocks on disk is allowed. Manager 708 sends pre-fetch and eviction instructions to BlockManagerMaster 706, which in turn instructs the cache 716-1, 716-2, 716-3 in each worker node to drop RDDs that are being processed.

Where a decider component is employed (e.g., alternative embodiment), after receiving the message of decreasing RDD size, the decider component obtains the DAG of the current stage from DAG scheduler 704. Based on the DAG, the decider tries to avoid dropping the RDDs that are currently being depended on. If it is not possible to avoid dropping the RDDs, the decider will calculate the smallest RDD block to drop. Finally, the Cache Manager component invokes the real size change and RDD eviction if needed.

Regarding determination of the RDDs to drop and the RDDs to pre-fetch, refer again to FIG. 6 and accompanying discussion. If a task has been processed, also look at task dependencies of the RDD block. If the RDD block is not being used by other tasks that will be processed in the next epoch (the duration of the epoch can be specified; say 20-30 seconds in a non-limiting example), evict the RDD block from the cache and store on disk (if allowed). Recall that users can specify whether RDDs are stored only in memory, only in disk, or in both.

Figure 8:
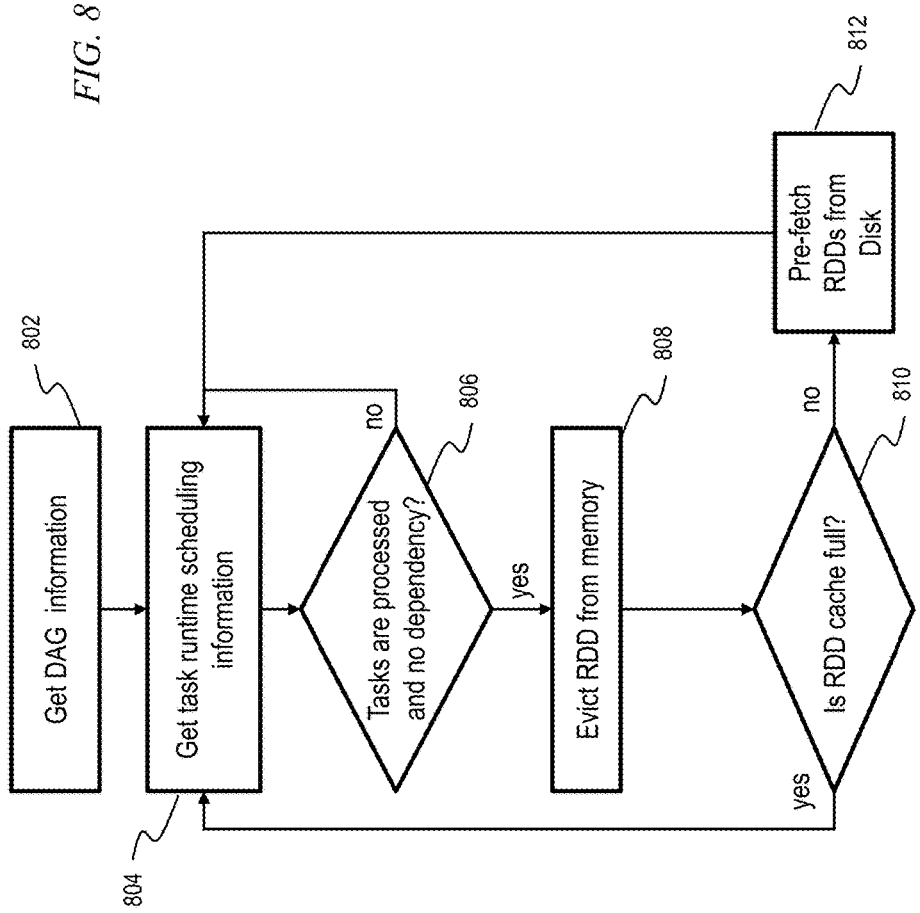
FIG. 8 depicts an exemplary RDD cache management workflow, according to an aspect of the invention.

FIG. 8 shows an exemplary workflow of RDD Cache management. This is the workflow of the cache manager 708. In step 802, obtain the DAG information from block 704. In step 804, obtain the task runtime scheduling information from cluster resource monitor 710. In decision block 806, determine whether the given task(s) have been processed and there is no dependency; if so (YES branch), evict the RDD from memory (cache 716) in step 808 by instructing BlockManagerMaster 706 and proceed to decision block 810. Otherwise, as per the NO branch of decision block 806, don't evict but rather go back to step 804. In decision block 810, determine whether the RDD cache is full; if yes, go back to step 804; if NO, pre-fetch appropriate RDDs from disk in step 812 and then go back to step 804. The process in FIG. 8 can be run periodically, for example, in epoch intervals.

Further consider pre-fetching of data blocks. In one or more embodiments the cache manager 708 decides when and how much to pre-fetch. Regarding "when," one or more embodiments pre-fetch when the current I/O bandwidth utilization is smaller than a threshold, say 70%, to avoid competition of I/O bandwidth with shuffle and task execution for reading inputs from an external storage system such as the Hadoop Distributed File System (HDFS). Regarding "how much," one or more embodiments use an automatically adjusted pre-fetch window size to determine how many RDD blocks are pre-fetched in each epoch. The total size of pre-fetched blocks and existing blocks should not exceed the RDD cache size. One or more embodiments give a higher priority to the RDD blocks that are already cached, and pre-fetch based on the scheduling sequence in the task queue of the executor 714-1, 714-2, 714-3 until the RDD cache is full. For example, if total cached data occupies 60% of the cache while the data to be pre-fetched occupies another 60% of the cache, do not evict the cached data but pre-fetch only 40% of the data if the cached data will be reused in the next compute phase(s).

By way of clarification and provision of additional detail, one or more embodiments carry out pre-fetching when the current I/O bandwidth utilization is smaller than a threshold (say 70%; not being actively used by shuffle and task execution). Recall that the RDD cache is being managed within the Spark framework. Spark also requires utilization of disk bandwidth when it carries out some other computation tasks such as shuffle and task execution. So, one or more embodiments seek to avoid competing with I/O demands from Spark and the application itself. One or more embodiments examine the task scheduling graph to determine which pertinent RDD blocks will be needed in the next epoch. One or more embodiments are more conservative towards RDD blocks that will be used in the next 2-3 epochs. Regarding an epoch, in a non-limiting example, an average task duration may be, say, 1-5 seconds. This depends on the average task duration for the application, which is application-dependent.

It is worth noting that cache management is being widely studied in the traditional operating system (OS) and memory management domain. Least Recently Used (LRU) and Least Frequently Used (LFU) are current techniques; however, prior art techniques are within a single machine while one or more embodiments operate in a distributed setting. In contrast to one or more embodiments of the invention, the prior art does not consider DAG information.

Some aspects of the invention do not consider the RDD cache size; another aspect, discussed below, tunes the size of the RDD cache.

One or more embodiments focus on the Spark framework with the memory configuration inside the Java Virtual machine (JVM) heap. Previous OS memory replacement uses policies such as LRU and LFU, as discussed above. However, in one or more embodiments, when it is decided to evict RDDs, the DAG information is utilized to avoid evicting RDDs that are needed.

Some prior art techniques persist RDDs outside Spark with off-heap memory, potentially reducing GC overhead; however, off-heap memory management outside Spark introduces data serialization and de-serialization overhead. Moreover, managing memory outside Spark fails to utilize the workload knowledge which may potentially help workload optimization.

Thus, one or more embodiments dynamically change the memory allocation during the execution of workloads. One or more embodiments provide a system and method for dynamically managing RDD cache-based DAG information for in-memory data analytic platforms. One or more embodiments include a monitor component 718-1, 718-2, 718-3 that retrieves current task scheduling information from data analytic platforms periodically, and an RDD cache management component 708 that evicts RDDs not needed and pre-fetches RDDs that will be used soon.

In another aspect, a method and system of dynamic memory tuning in DAG-based data analytic platforms are provided; i.e., dynamic memory tuning—tuning the size of the RDD cache. In a DAG-based in-memory data analytic framework or platform, RDD based computation is employed using a DAG of RDDs. Pertinent features as compared to a relational database management system (RDBMS) include no use of structured query language (SQL); and the ability to perform generic complex computations on data. Furthermore, the memory allocation between RDD, shuffle and task execution is not seen before in RDBMS.

As noted, Spark is widely used for big data analytics. It is reported to be more than several magnitudes faster than Hadoop due to its ability to persist data in memory. As also noted, in Spark, data sets are processed in the form of resilient distributed datasets (RDDs), and calculation is done by transforming and computing RDDs.

Figure 9:
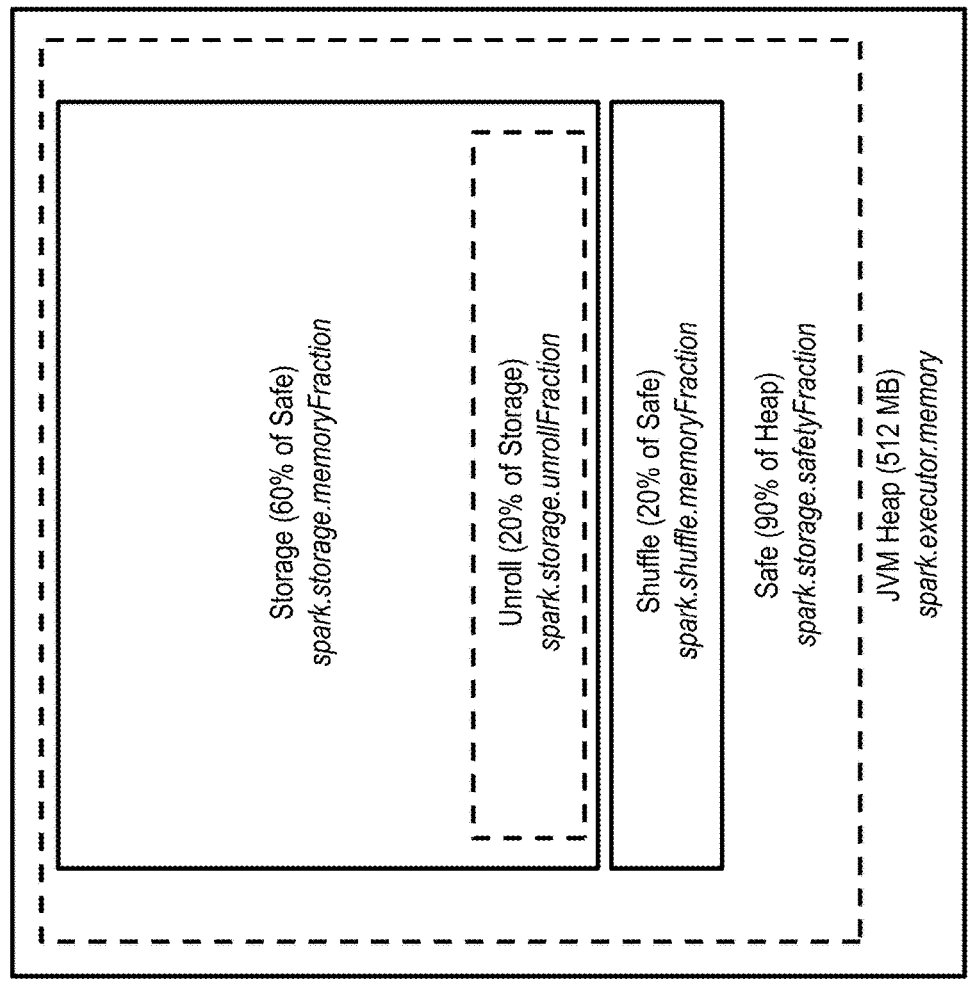
FIG. 9 shows current Spark memory management.

FIG. 9 shows aspects of memory management. Memory is a scarce resource for Spark. Memory is needed for RDD caching, task execution, shuffle, and de-serialization. Current Spark only supports static memory configuration in the application level. Memory access accelerates Spark job processing times, but also leads to high demand for memory resources. Efficiently managing such resources is a challenge. Currently in Spark, memory is divided into several partitions for different uses, and the user is allowed to decide the ratio for these partitions. FIG. 9 shows the default Spark memory partitions. Spark starts with the 512 MB JVM heap. To be on the safe side and avoid out of memory errors, Spark allows use of only 90% of the heap, which is controlled by the spark.storage.safetyFraction parameter of Spark. By default, 60% out of a safety memory of 90% is used for RDD storage, and 20% is used for shuffle. The rest is used for task execution. "Unroll" memory is the amount of RAM that is allowed to be utilized by the unroll process. One or more embodiments dynamically configure the RDD cache size (which heretofore has been fixed at 60%), thus changing the RDD cache size during execution. Currently, Spark only supports static configuration—if the RDD cache size is set at 60%, it will use that value for the entire job execution; if set at 20%, it will use that value for the whole job execution, and so on. One or more embodiments dynamically change the RDD cache size.

Figure 10:
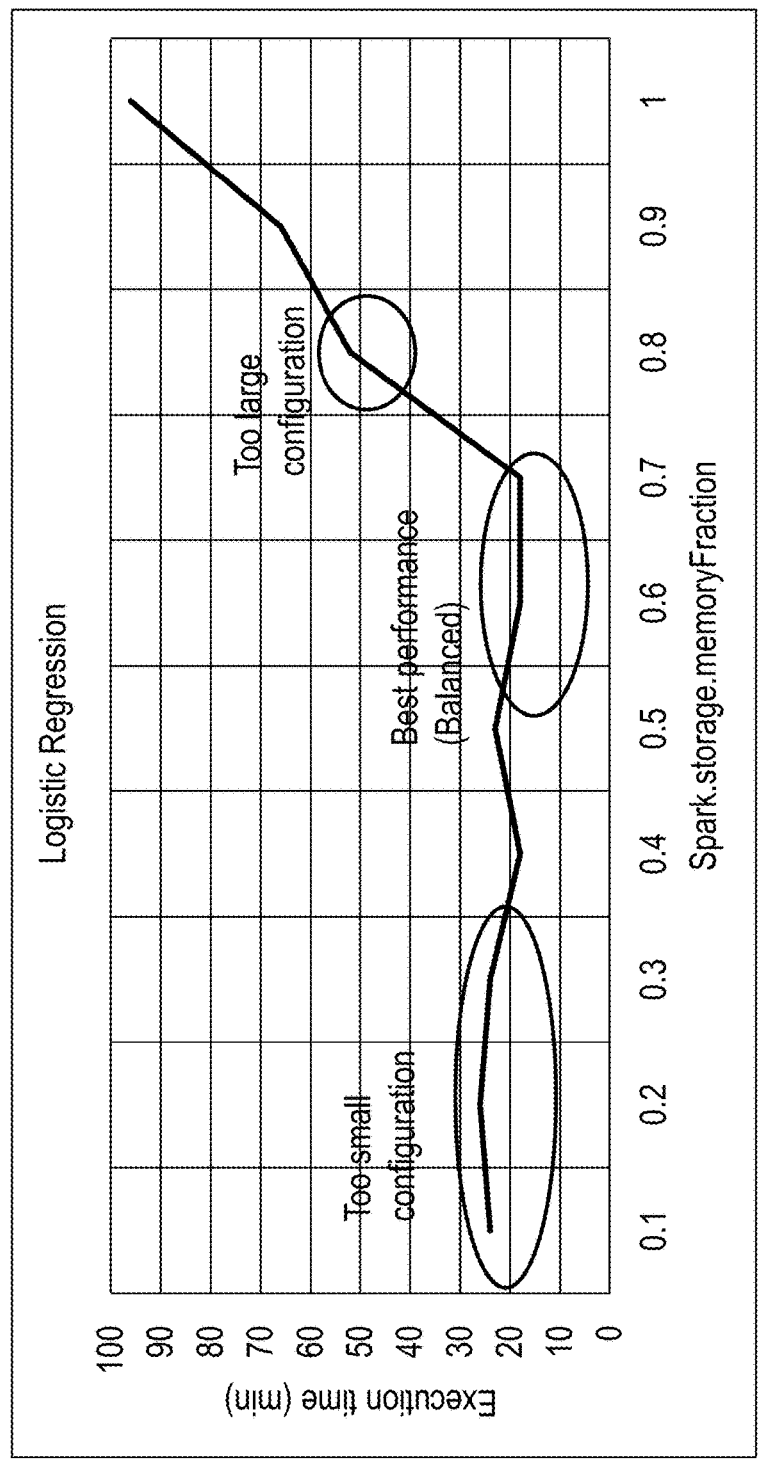
FIG. 10 shows problematic performance observed in a system not using one or more aspects of the invention (suboptimal memory management)

FIG. 10 shows, for a logistic regression example, how suboptimal memory management can lead to significant performance degradation and low memory efficiency. The experiment shows potential bad performance with static configuration (same fraction used throughout execution). The X-axis is the memory fraction allocated to the RDD cache and the Y-axis is the execution time. A small RDD caching size ("Too small configuration") causes cache misses resulting in RDD recalculation, while a too large RDD caching size ("Too large configuration") leaves not enough space for task execution, resulting in GC overhead. Best results are obtained in the balanced case.

Thus, such a static configuration mechanism of Spark is not optimal in two ways. First, suboptimal configuration can lead to significant performance degradation and low memory efficiency. Based on experiments for logistic regression, we have found that too small a configuration of the RDD cache size causes cache miss and low utilization of the memory, while too large a configuration of the RDD cache size leaves not enough space for task execution and shuffle operations, resulting in a large GC overhead and performance degradation. Finding an optimal configuration is non-trivial.

It will thus be appreciated that static workload configuration has limitations. In the case of single workload execution, different jobs and/or stages inside one workload require different RDDs with various sizes (thus, the size of the RDD that needs to be cached varies over time); different job tasks need different sizes of memory; and poor configuration can cause overhead or even executor failure with out-of-memory error. Accordingly, tasks of different stages may have different needs for memory resources. For memory intensive tasks, there will be a memory contention with RDD. On the other hand, for low memory tasks, there will be un-utilized memory in the system.

In the case of multiple workloads running at the same time in a multitenant environment, memory contentions among the workloads are dynamic, different workloads have different priorities, and different workloads might require different optimal cache sizes (one best configuration for one workload may not be the best overall).

One or more embodiments advantageously provide Dynamic RDD memory tuning; i.e., dynamically changing the RDD cache size during runtime, considering workload characteristics, job needs, RDD cache, workload priority, job memory demand, RDD memory locality, and the like. Benefits include improved single workload execution performance, guarantee of multiple workload performance according to priority in a multitenant environment, and improved memory utilization efficiency. Indeed, by configuring the memory dynamically, one or more embodiments provide improved workload execution performance with ideal RDD cache hits and minimized GC overhead (improved single workload execution performance by avoiding contention between task execution and RDD cache size). In a multitenant environment, by changing configurations of each workload dynamically, one or more embodiments provide an overall performance and resource utilization. For multiple jobs/applications running at the same time, one or more embodiments prioritize the workloads that are more important to use more memory, to ensure that pertinent resources are allocated to pertinent tasks.

Figure 11:
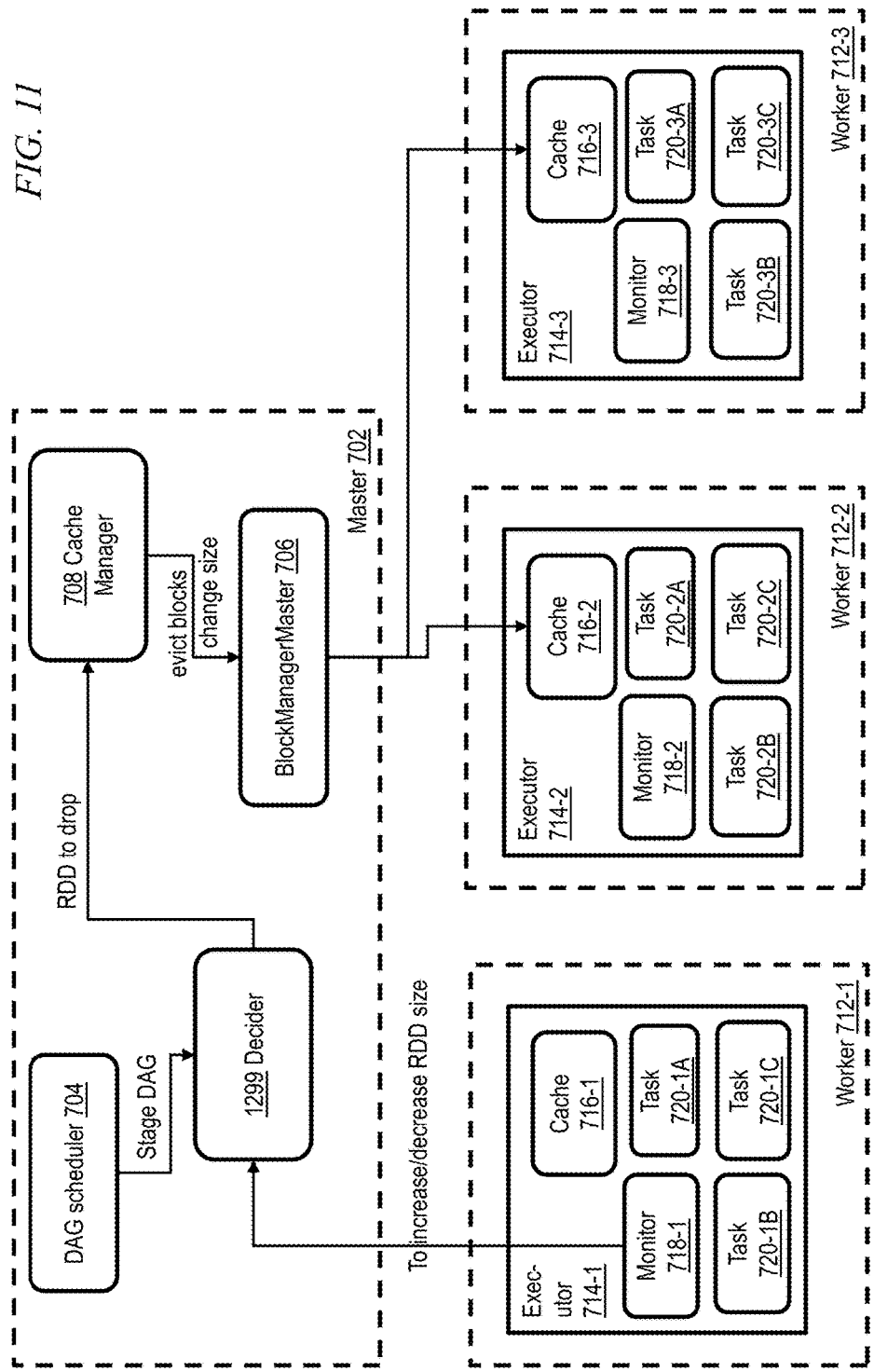
FIG. 11 depicts an exemplary Dynamic RDD memory tuning architecture, according to an aspect of the invention.

FIG. 11 shows an exemplary dynamic memory tuning architecture. Items similar to FIG. 7 have received the same reference character. In the non-limiting example of FIG. 11, decider component 1299 decides what RDDs to drop. Monitor 718-1, 718-2, 718-3, similar to before, gathers task statistics, task progress rate, I/O bandwidth utilization, and the like. Some embodiments merge the functionality of the decider 1299 and the cache manager 708 together; in such cases, the cache manager 708 will decide the RDD cache size, what RDDs to drop, and what RDDs to bring in. Thus, aspects of the invention include dynamically deciding what size the cache should be (FIG. 11) and deciding cache content (what to evict, what to pre-fetch) (FIG. 7).

The exemplary system of FIG. 11 includes a monitor component 718-1, 718-2, 718-3 that runs on each executor 714-1, 714-2, 714-3 to monitor the memory usage statistics periodically; one non-limiting example of such memory usage can be garbage collection (GC) frequency. Based on the observations, the monitor 718-1, 718-2, 718-3 decides whether to increase or decrease the RDD cache size, and tells the decider component 1299 to make size changes. The decider component 1299 assists RDD eviction when the monitor decides to decrease the RDD cache size; by gathering the DAG information from DAG scheduler 704, evicting of needed RDDs can be avoided. Cache manager component 708 actually changes the size and evicts RDDs when needed. Again, in other embodiments, the functionality of decider 1299 and cache manager 708 is combined. Furthermore, the embodiment of FIG. 11 could employ a cluster resource monitor 710 as shown in FIG. 7 if desired.

Figure 12:
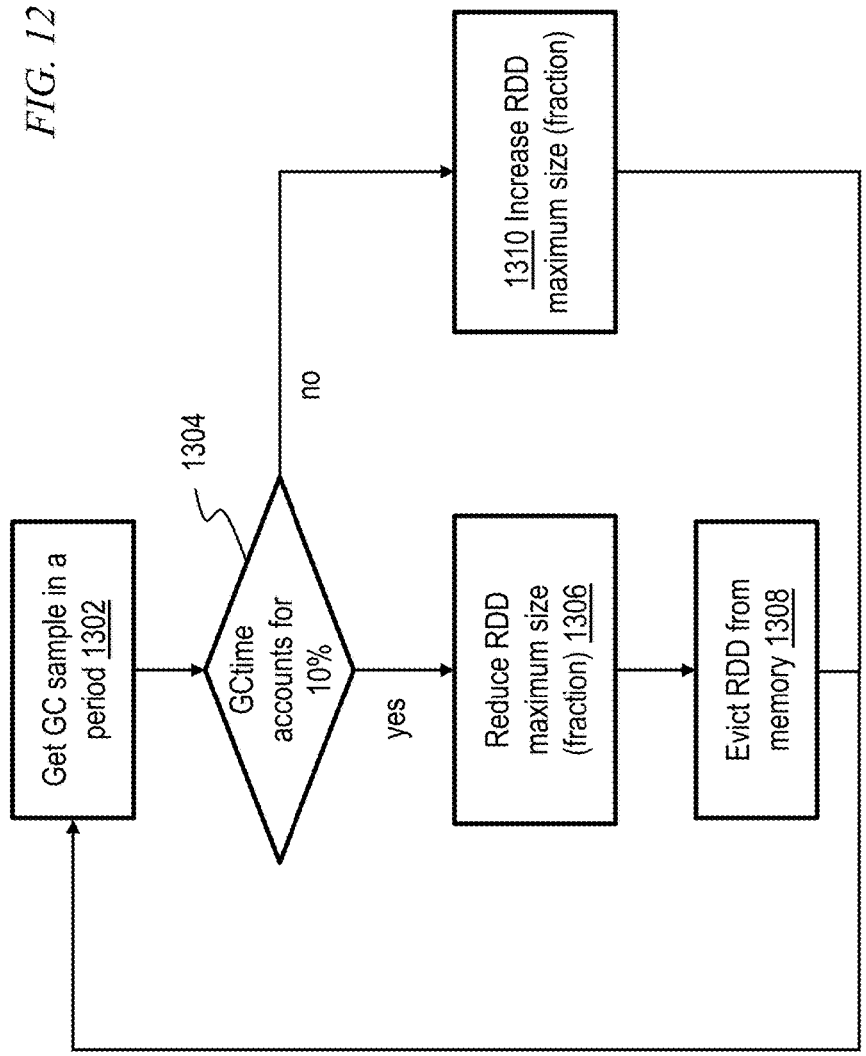
FIG. 12 depicts an exemplary system workflow, according to an aspect of the invention.

FIG. 12 shows an exemplary workflow for the monitor component to decide how to change the RDD cache size. As shown in step 1302, monitor the GC (garbage collection) time for a given sample period or epoch. If high GC time is observed (e.g., exceeding a predefined threshold such as 10% or more of the task execution time), as per the YES branch of decision block 1304, contention between tasks and the RDD cache size is suspected. In such cases, give priority to task execution and thus reduce the RDD cache size in step 1306 (by a predetermined amount—e.g., a configurable fraction such as 5% at a time). Since the RDD cache has been shrunken, data must be evicted in step 1308. This frees up space for tasks. On the other hand, as per the NO branch of block 1304, in step 1310, if GC is less than 10%, assume tasks are using too little memory and increase the RDD cache size. In either case, after step 1308 or step 1310 as the case may be, return to step 1302 and monitor again, thus maintaining GC overhead in a controllable range.

Figure 13:
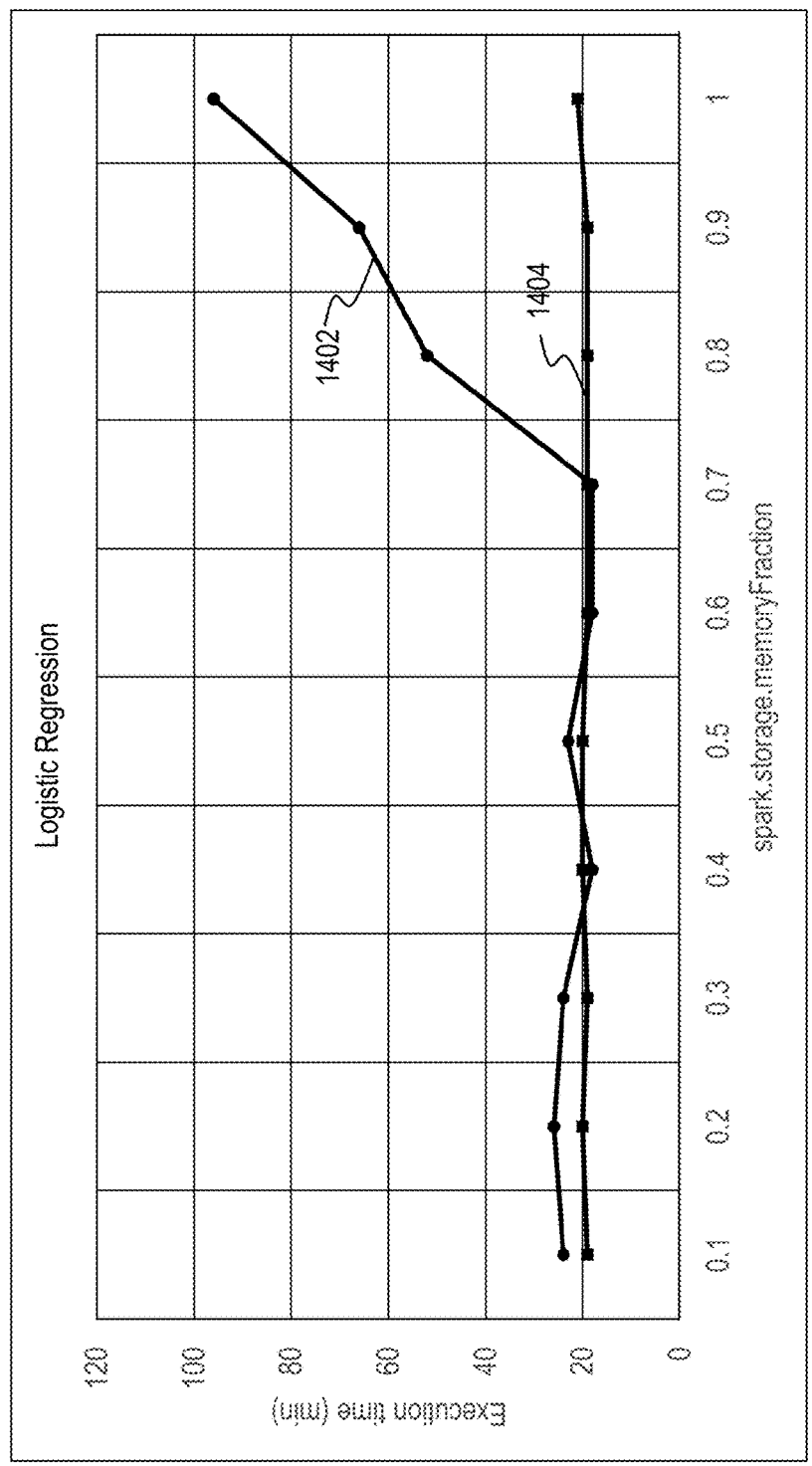
FIGS. 13 and 14 show experimental results depicting illustrative examples of improvements noted with an embodiment of the invention as compared to current techniques.

FIG. 13 shows non-limiting exemplary experimental results (execution time versus memory fraction used for RDD) for a static approach (curve 1402) versus a dynamic approach in accordance with an aspect of the invention (curve 1404). It can be seen that, by using the dynamic approach, execution time is low regardless of memory fraction. The experiments were conducted with a Logistic Regression workload, 100 GB data size and eight worker nodes. It can be seen that, on both sides, where the fraction is 0.1 to 0.3, and where the fraction is higher than 0.7, the inventive method 1404 performs better.

Figure 14:
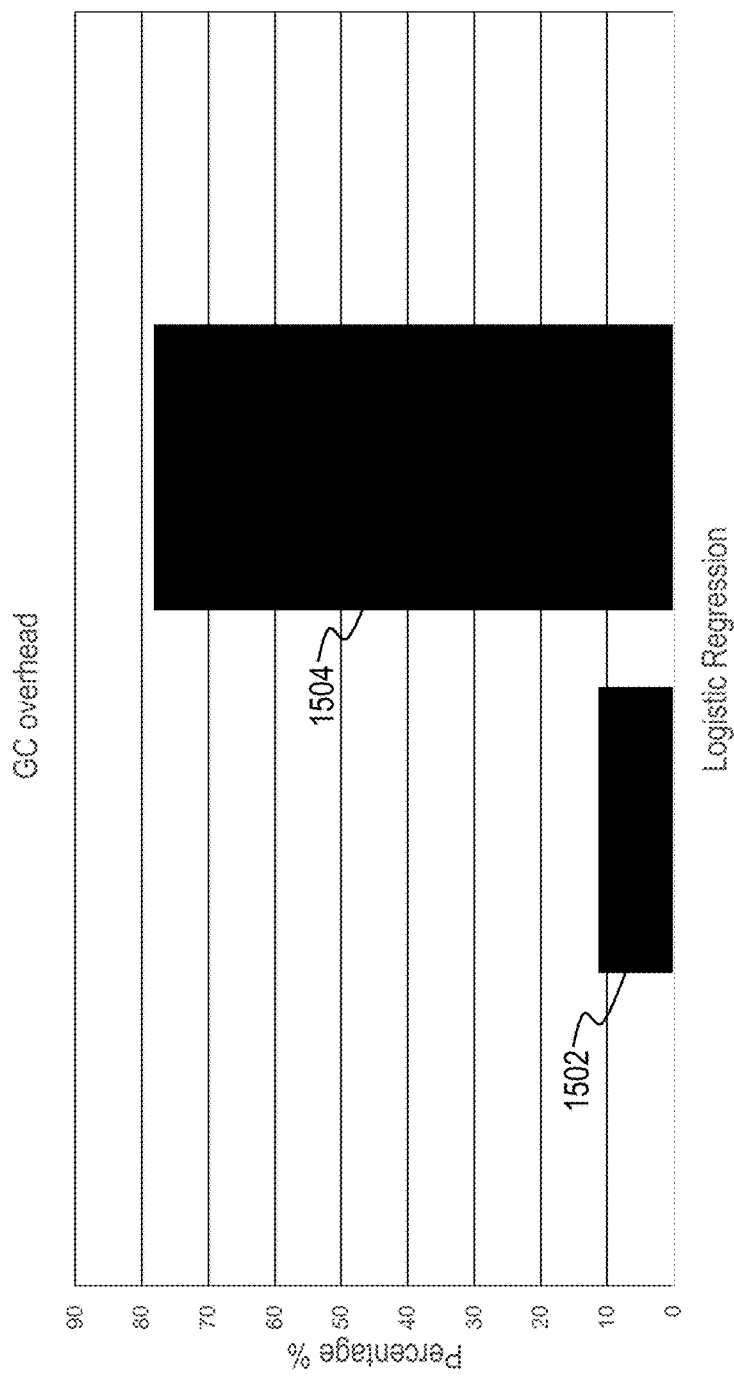

FIG. 14 shows additional non-limiting exemplary experimental results. To further understand the performance improvement on the higher side, the GC overhead was recorded with the fraction value set to 1. The average GC compute time was recorded, and was divided by the workload execution time, to obtain the fraction (optionally percentage if multiply by 100) of GC overhead. An exemplary method employing aspects of the invention, as at 1502, shows much less GC overhead than the default method 1504; this is because the inventive monitor component maintains GC time in a controllable range. Thus, FIG. 14 provides a non-limiting example illustrating the advantage of dynamic memory tuning.

In prior art approaches to virtual memory management in operating systems, memory allocators serve every application running on the OS, without consideration of how each application uses the memory allocated. Unlike prior art approaches, one or more embodiments focus on the Spark framework with the memory configuration inside the JVM heap, and trade off usage of the RDD cache and task execution. By avoiding off-heap memory management outside Spark, one or more embodiments avoid introduction of data serialization and de-serialization overhead, and one or more embodiments permit utilization of the workload knowledge which helps workload optimization.

One or more embodiments advantageously provide a system and method for dynamically changing memory cache sizes for DAG-based data analytic platforms. In one or more embodiments, the method is implemented with a system including a monitor component 718-1, 718-2, 718-3 that retrieves memory statistics from data analytic platforms periodically (one non-limiting example of memory statistics includes GC time or working set estimation); a management component 708 that changes RDD caching size (RDD cache is a portion of memory allocated to store RDD data partitions in memory); and a decider component 1299 that assists RDD eviction based on LRU. As noted, some embodiments merge the decider and manager.

In a non-limiting example, the decider 1299 obtains a message from the monitor 718-1, 718-2, or 718-3. If the monitor tells the decider to decrease the RDD size, the decider obtains the current stage DAG from DAG scheduler 704, calculates the RDDs to drop, and sends a message to the Cache Manager 708. After receiving the message to decrease the RDD size, the decider component obtains the DAG of the current stage from DAG scheduler 704. Based on the DAG, the decider tries to avoid dropping the RDDs that there are current dependencies on. If dropping RDDs cannot be avoided, it will calculate the smallest RDD block to drop. Finally the Cache Manager component 708 invokes the real size change and RDD eviction if needed.

Given the discussion thus far, it will be appreciated that an exemplary method, according to an aspect of the invention, includes the step of 1302 of obtaining, at a cache manager 708 of a directed acyclic graph-based data analytic platform, from each of a plurality of monitor components 718 on a plurality of worker nodes 712 of the directed acyclic graph-based data analytic platform, memory usage statistics for the worker nodes of the directed acyclic graph-based data analytic platform. The worker nodes have a plurality of tasks executing thereon, and each of the tasks has at least one distributed dataset associated therewith. Each of the worker nodes has a distributed dataset cache 716. A further step includes carrying out at least one of:

as at 1310, increasing a size of a given one of the distributed dataset caches if the memory usage statistics indicate that corresponding ones of the tasks are using too little memory; and as at 1306, decreasing a size of another given one of the distributed dataset caches if the memory usage statistics indicate contention between corresponding ones of the tasks and a corresponding one of the distributed datasets.

In a non-limiting exemplary embodiment, the at least one distributed dataset includes a resilient distributed dataset (RDD), such as is used in the Spark framework, and the distributed dataset caches include resilient distributed dataset (RDD) caches. However, as will be appreciated by the skilled artisan, given the teachings here, other embodiments can be used with other types of distributed data.

In some cases, the memory usage statistics include garbage collection time, the memory usage statistics indicate that corresponding ones of the tasks are using too little memory when the garbage collection time does not exceed a threshold (NO branch of block 1304), and the memory usage statistics indicate contention between corresponding ones of the tasks and a corresponding one of the resilient distributed datasets when the garbage collection time does exceed the threshold (YES branch of block 1304). The skilled artisan will appreciate that in the field of computer science, garbage collection (GC) is a form of automatic memory management. The garbage collector, or just collector, attempts to reclaim garbage, or memory occupied by objects that are no longer in use by the program.

In one or more embodiments, the step of carrying out at least one of increasing and decreasing is carried out with the cache manager component 708.

In some instances, further steps include, as at 1304, determining whether the garbage collection time exceeds the threshold, with the plurality of monitor components; when the garbage collection time does exceed the threshold (YES branch of block 1304), initiating, with the plurality of monitor components, a message to a decider component 1299 to reduce the size of the another given one of the distributed dataset caches; and, when the garbage collection time does not exceed the threshold (NO branch of block 1304), initiating, with the plurality of monitor components, a message to the decider component to increase the size of the given one of the distributed dataset caches.

In one or more embodiments, when the decider component 1299 obtains the message to reduce the size of the another given one of the distributed dataset caches, the decider component obtain, from a directed acyclic graph scheduler component 704, a current stage directed acyclic graph; the decider component determines at least one of the resilient distributed datasets to drop, based on the current stage of the directed acyclic graph, to avoid dropping other, needed ones of the resilient distributed datasets; and the decider component initiates a message to the cache manager 708 to drop the at least one of the resilient distributed datasets.

As noted above, functionality of the decider component can simply be realized within the cache manager, or the decider component can be realized separately from, but in communication with, the cache manager.

In another aspect, an exemplary directed acyclic graph-based data analytic platform includes a plurality of worker nodes 712, a plurality of monitor components 718 on the plurality of worker nodes, a plurality of distributed dataset caches 716 on the plurality of worker nodes, and a cache manager 708, coupled to the plurality of monitor components (in a non-limiting example, coupled via the decider component 1299; other cases could be coupled directly or through other component(s)). The cache manager obtains, from each of the plurality of monitor components on the plurality of worker nodes, memory usage statistics for the worker nodes. The worker nodes have a plurality of tasks executing thereon, and each of the tasks has at least one distributed dataset associated therewith. The cache manager carries out at least one of: increasing a size of a given one of the distributed dataset caches if the memory usage statistics indicate that corresponding ones of the tasks are using too little memory; and decreasing a size of another given one of the distributed dataset caches if the memory usage statistics indicate contention between corresponding ones of the tasks and a corresponding one of the distributed datasets.

In a non-limiting exemplary embodiment, the at least one distributed dataset includes a resilient distributed dataset (RDD), such as is used in the Spark framework, and the distributed dataset caches include resilient distributed dataset (RDD) caches. However, as will be appreciated by the skilled artisan, given the teachings here, other embodiments can be used with other types of distributed data.

In some cases, the memory usage statistics include garbage collection time; the memory usage statistics indicate that corresponding ones of the tasks are using too little memory when the garbage collection time does not exceed a threshold (NO branch of block 1304); and the memory usage statistics indicate contention between corresponding ones of the tasks and a corresponding one of the resilient distributed datasets when the garbage collection time does exceed the threshold (YES branch of block 1304).

One or more embodiments further include the aforementioned decider component 1299 coupled to the cache manager and the plurality of monitor components. The plurality of monitor components determine whether the garbage collection time exceeds the threshold (decision block 1304). When the garbage collection time does exceed the threshold, the plurality of monitor components initiate a message to the decider component to reduce the size of the another given one of the distributed dataset caches; and, when the garbage collection time does not exceed the threshold, the plurality of monitor components initiate a message to the decider component to increase the size of the given one of the distributed dataset caches.

Note that when it is stated herein, including the claims, that the plurality of monitor components initiate a message, it is not intended to imply that each and every one of the components sends a message; only those one or more monitor components for whose worker nodes the corresponding message is appropriate.

One or more embodiments further include a directed acyclic graph scheduler component 704 coupled to the decider component. When the decider component obtains the message to reduce the size of the another given one of the distributed dataset caches, the decider component obtains, from the directed acyclic graph scheduler component, a current stage directed acyclic graph; the decider component determines at least one of the resilient distributed datasets to drop, based on the current stage of the directed acyclic graph, to avoid dropping other, needed ones of the resilient distributed datasets; and the decider component initiates a message to the cache manager to drop the at least one of the resilient distributed datasets.

Again, as noted, in some cases, the decider component is realized within the cache manager, while in other cases, the decider component is realized separately from but in communication with the cache manager.

Note that three executors, three workers, three caches, and three monitors are shown in FIG. 11, but other embodiments could have fewer or more of each of these components. Furthermore, each executor is shown as having three tasks, but the executors can have different numbers of tasks than three (more or less) and different executors can have different numbers of tasks than other executors.

The cluster resource monitor 710 is a component in management node 702 that communicates with monitors 718 on worker nodes 712 and coordinates them and passes information to cache manager 708. Worker nodes 712 can be similar, for example, to the node 10 in FIG. 1. One or more non-limiting exemplary embodiments can be implemented, for example, on virtualized servers in layer 62 running on physical servers in layer 60 in FIG. 3.

Note also that BlockManagerMaster 706 can communicate with any of the caches 716-1, 716-2, and 716-3, and that Decider 1299, when present, can communicate with any of the monitors 718-1, 718-2, and 718-3.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

The skilled artisan will appreciate from the context whether volatile memory/cache or nonvolatile memory/disk is being referred to in a particular mention of "memory."

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-3 and accompanying text. Note, e.g., the rightmost "cache management and memory tuning" functionality in layer 64.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks shown in FIGS. 7 and 11.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining, at a cache manager of a directed acyclic graph-based data analytic platform, from each of a plurality of monitor components on a plurality of worker nodes of said directed acyclic graph-based data analytic platform, memory usage statistics for said worker nodes of said directed acyclic graph-based data analytic platform, said worker nodes having a plurality of tasks executing thereon, each of said tasks having at least one distributed dataset associated therewith, each of said worker nodes having a distributed dataset cache, said memory usage statistics comprising garbage collection time;
    initiating, with said plurality of monitor components, a message to a decider component to reduce a memory allocation size of a given one of said distributed dataset caches upon determining, with said plurality of monitor components, that said garbage collection time exceeds a threshold;
    when said decider component obtains said message to reduce said size of said given one of said distributed dataset caches:
        obtaining, by said decider component, from a directed acyclic graph scheduler component, a current stage directed acyclic graph;
        with said decider component, determining at least one of said distributed datasets to drop, based on said current stage of said directed acyclic graph, to avoid dropping other, needed ones of said distributed datasets; and
        initiating, with said decider component, a message to said cache manager to drop said at least one of said distributed datasets; and
    when said cache manager receives said message to drop said at least one of said distributed datasets, reducing said memory allocation size of said given one of said distributed dataset caches after dropping said at least one of said distributed datasets,
    wherein determining at least one of said distributed datasets to drop further comprises:
    identifying, from said current stage directed acyclic graph, a first plurality of said distributed datasets currently stored in said given one of said distributed dataset caches that are being processed by tasks in a current epoch;
    identifying, from said current stage directed acyclic graph, a second plurality of said distributed datasets currently stored in said given one of said distributed dataset caches that will be used by tasks to be processed in a next epoch;
    identifying, in said given one of said distributed dataset caches, at least one of said distributed datasets that is not a member of said first or second pluralities of said distributed datasets; and
    selecting to drop said at least one of said distributed datasets that is not a member of said first or second pluralities of said distributed datasets.

2. The method of claim 1, wherein said at least one distributed dataset comprises a resilient distributed dataset, and said distributed dataset caches comprise resilient distributed dataset caches.

3. The method of claim 1, wherein:
    said memory usage statistics indicate that corresponding ones of said tasks are using too little memory when said garbage collection time does not exceed said threshold; and
    said memory usage statistics indicate contention between corresponding ones of said tasks and a corresponding one of said distributed datasets when said garbage collection time does exceed said threshold.

4. The method of claim 1, further comprising:
    initiating, with said plurality of monitor components, a message to said decider component to increase a memory allocation size of another given one of said distributed dataset caches upon determining, with said plurality of monitor components, that said garbage collection time does not exceed said threshold.

5. The method of claim 1, wherein, in said initiating steps, said decider component is realized within said cache manager.

6. The method of claim 1, wherein, in said initiating steps, said decider component is realized separately from but in communication with said cache manager.

7. A directed acyclic graph-based data analytic platform comprising:
    a plurality of worker nodes;
    a plurality of monitor components on said plurality of worker nodes;
    a plurality of distributed dataset caches on said plurality of worker nodes;
    a cache manager, coupled to said plurality of monitor components, which:
        obtains, from each of said plurality of monitor components on said plurality of worker nodes, memory usage statistics for said worker nodes, said worker nodes having a plurality of tasks executing thereon, each of said tasks having at least one distributed dataset associated therewith, said memory usage statistics comprising garbage collection time; and
        carries out at least one of:
            increasing a memory allocation size of a given one of said distributed dataset caches if said memory usage statistics indicate that corresponding ones of said tasks are using too little memory; and
            decreasing a memory allocation size of another given one of said distributed dataset caches if said memory usage statistics indicate contention between corresponding ones of said tasks and a corresponding one of said distributed datasets;

a decider component coupled to said cache manager and to said plurality of monitor components, wherein said plurality of monitor components:
  determine whether said garbage collection time exceeds a threshold; and
  when said garbage collection time does exceed said threshold, initiate a message to said decider component to reduce said memory allocation size of said another given one of said distributed dataset caches; and
a directed acyclic graph scheduler component coupled to said decider component,
wherein, when said decider component obtains said message to reduce said memory allocation size of said another given one of said distributed dataset caches:
  said decider component obtains, from said directed acyclic graph scheduler component, a current stage directed acyclic graph;
  said decider component determines at least one of said distributed datasets to drop, based on said current stage of said directed acyclic graph, to avoid dropping other, needed ones of said distributed datasets; and
  said decider component initiates a message to said cache manager to drop said at least one of said distributed datasets;
when said cache manager receives said message to drop said at least one of said distributed datasets, said cache manager reduces said memory allocation size of said another given one of said distributed dataset caches after dropping said at least one of said distributed datasets; and
wherein determining at least one of said distributed datasets to drop further comprises:
  identifying, from said current stage directed acyclic graph, a first plurality of said distributed datasets currently stored in said another given one of said distributed dataset caches that are being processed by tasks in a current epoch;
  identifying, from said current stage directed acyclic graph, a second plurality of said distributed datasets currently stored in said another given one of said distributed dataset caches that will be used by tasks to be processed in a next epoch;
  identifying, in said another given one of said distributed dataset caches, at least one of said distributed datasets that is not a member of said first or second pluralities of said distributed datasets; and
  selecting to drop said at least one of said distributed datasets that is not a member of said first or second pluralities of said distributed datasets.

8. The directed acyclic graph-based data analytic platform of claim 7, wherein said at least one distributed dataset comprises a resilient distributed dataset, and said distributed dataset caches comprise resilient distributed dataset caches.

9. The directed acyclic graph-based data analytic platform of claim 7 wherein when said garbage collection time does not exceed said threshold, said plurality of monitor components initiate a message to said decider component to increase said memory allocation size of said given one of said distributed dataset caches.

10. The directed acyclic graph-based data analytic platform of claim 7, wherein said decider component is realized within said cache manager.

11. The directed acyclic graph-based data analytic platform of claim 7, wherein said decider component is realized separately from but in communication with said cache manager.

12. A non-transitory computer readable medium comprising computer executable instructions which when executed by a computer cause the computer to perform a method comprising:
  obtaining, at a cache manager of a directed acyclic graph-based data analytic platform, from each of a plurality of monitor components on a plurality of worker nodes of said directed acyclic graph-based data analytic platform, memory usage statistics for said worker nodes of said directed acyclic graph-based data analytic platform, said worker nodes having a plurality of tasks executing thereon, each of said tasks having at least one distributed dataset associated therewith, each of said worker nodes having a distributed dataset cache, said memory usage statistics comprising garbage collection time;
  determining, with said plurality of monitor components, whether said garbage collection time exceeds a threshold;
  when said garbage collection time does exceed said threshold, initiating, with said plurality of monitor components, a message to a decider component to reduce a memory allocation size of a given one of said distributed dataset caches;
  when said decider component obtains said message to reduce said memory allocation size of said given one of said distributed dataset caches:
    obtaining, by said decider component, from a directed acyclic graph scheduler component, a current stage directed acyclic graph;
    with said decider component, determining at least one of said distributed datasets to drop, based on said current stage of said directed acyclic graph, to avoid dropping other, needed ones of said distributed datasets; and
    initiating, with said decider component, a message to said cache manager to drop said at least one of said distributed datasets; and
  when said cache manager receives said message to drop said at least one of said distributed datasets, reducing said memory allocation size of said given one of said distributed dataset caches after dropping said at least one of said distributed datasets;
  wherein determining at least one of said distributed datasets to drop further comprises:
    identifying, from said current stage directed acyclic graph, a first plurality of said distributed datasets currently stored in said given one of said distributed dataset caches that are being processed by tasks in a current epoch;
    identifying, from said current stage directed acyclic graph, a second plurality of said distributed datasets currently stored in said given one of said distributed dataset caches that will be used by tasks to be processed in a next epoch;
    identifying, in said given one of said distributed dataset caches, at least one of said distributed datasets that is not a member of said first or second pluralities of said distributed datasets; and
    selecting to drop said at least one of said distributed datasets that is not a member of said first or second pluralities of said distributed datasets.

13. The non-transitory computer readable medium of claim 12, wherein, in said method step of obtaining said memory usage statistics and said method step of carrying out at least one of increasing and decreasing, said at least one distributed dataset comprises a resilient distributed dataset, and said distributed dataset caches comprise resilient distributed dataset caches.

14. The non-transitory computer readable medium of claim 12, wherein said computer executable instructions, when executed by said computer, further cause the computer to perform:
   when said garbage collection time does not exceed said threshold, initiating, with said plurality of monitor components, a message to said decider component to increase said memory allocation size of said given one of said distributed dataset caches.

* * * * *